(12) United States Patent
Curry et al.

(10) Patent No.: US 11,489,764 B2
(45) Date of Patent: Nov. 1, 2022

(54) FAILOVER SYSTEM AND METHOD FOR DIVERTING DATA TRAFFIC OVER A REPLACEMENT ACCESS NETWORK

(71) Applicant: BRITISH TELECOMMUNICATIONS PUBLIC LIMITED COMPANY, London (GB)

(72) Inventors: Thomas Curry, London (GB); Malcolm Hubert, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 74 days.

(21) Appl. No.: 16/764,940

(22) PCT Filed: Nov. 23, 2018

(86) PCT No.: PCT/EP2018/082348
§ 371 (c)(1),
(2) Date: May 18, 2020

(87) PCT Pub. No.: WO2019/105856
PCT Pub. Date: Jun. 6, 2019

(65) Prior Publication Data
US 2020/0351196 A1    Nov. 5, 2020

(30) Foreign Application Priority Data
Nov. 30, 2017 (EP) ..................................... 17204721

(51) Int. Cl.
*H04L 12/703* (2013.01)
*H04L 45/28* (2022.01)
(Continued)

(52) U.S. Cl.
CPC .............. *H04L 45/28* (2013.01); *H04L 45/02* (2013.01); *H04L 45/22* (2013.01); *H04L 45/74* (2013.01)

(58) Field of Classification Search
CPC ......... H04L 45/28; H04L 45/02; H04L 45/22; H04L 45/74; H04W 40/02
See application file for complete search history.

(56) References Cited

U.S. PATENT DOCUMENTS

2002/0080752 A1    6/2002  Johansson et al.
2006/0092955 A1*   5/2006  Durbin ................... H04L 45/22
                                                                370/466
(Continued)

FOREIGN PATENT DOCUMENTS

EP    2 561 641    2/2013
EP    2 865 141    4/2015
(Continued)

OTHER PUBLICATIONS

Combined Search and Examination Report for GB Application No. 1719966.2 dated May 22, 2018, 9 pages.
Extended European Search Report for EP Application No. 17204721.9 dated May 17, 2018, 8 pages.
International Search Report for PCT/EP2018/082348 dated Dec. 13, 2018, 2 pages.
(Continued)

Primary Examiner — Walli Z Butt
(74) Attorney, Agent, or Firm — Nixon & Vanderhye P.C.

(57) ABSTRACT

A communications router (6) is provided with an add-on device (7) for diverting data traffic over a replacement connection (70, 80) when a primary connection route (60) meets a failover criterion. Traffic addressed to an allocated network address associated with the primary connection (60) is diverted to a network termination of the replacement connection (70) by a routing function (31) if the replacement connection (70) has been authenticated by an authentication system (35). Authentication is provided by setting up an association between the internet IP address of the router (6) when addressed through the link (60), and a network identity (Continued)

of the add-in unit (7). This may achieved by having the add-on unit (7), when first installed, transmit its identity of a SIM over the fixed line connection (60) to the authentication system (35), which can then associate that SIM identity with the network address from which it has been received so that during a subsequent failover condition traffic addressed to the fixed-line network address can be diverted to the replacement connection, thereby allowing the same network address to be used during the failover condition.

21 Claims, 4 Drawing Sheets

(51) Int. Cl.
*H04L 45/02* (2022.01)
*H04L 45/00* (2022.01)
*H04L 45/74* (2022.01)

(56) References Cited

U.S. PATENT DOCUMENTS

| | | | |
|---|---|---|---|
| 2015/0326471 | A1 | 11/2015 | Anandan et al. |
| 2016/0286417 | A1* | 9/2016 | Joe .................. H04B 10/07 |
| 2017/0279664 | A1* | 9/2017 | Zhang ................ H04L 12/28 |

FOREIGN PATENT DOCUMENTS

| | | |
|---|---|---|
| EP | 2 926 586 | 10/2015 |
| EP | 3 189 624 | 7/2017 |

OTHER PUBLICATIONS

Written Opinion of the ISA for PCT/EP2018/082348 dated Nov. 7, 2019, 7 pages.
Examination Report issued in EP No. 18804019.0, dated Mar. 16, 2022, 9 pages.

* cited by examiner

FAILOVER SYSTEM AND METHOD FOR DIVERTING DATA TRAFFIC OVER A REPLACEMENT ACCESS NETWORK

This application is the U.S. national phase of International Application No. PCT/EP2018/082348 filed Nov. 23, 2018 which designated the U.S. and claims priority to EP Patent Application No. 17204721.9 filed Nov. 30, 2017, the entire contents of each of which are hereby incorporated by reference.

BACKGROUND AND SUMMARY

Example embodiments of the present invention relate to failover systems for communications systems. In particular it relates to diversion of data traffic addressed to an allocated network address over a replacement connection route when a primary route is not available, in order to ensure continuity of service. There are many types of user terminal which are configurable to connect to a communications network such as the "Internet" by several different media, selecting the medium which is most appropriate for the type of communication required (such as voice, data, streaming, etc) from amongst the connections currently available—for example fixed line (ADSL), cellular (GPRS/3G/4G), wireless LAN (wifi).

Should a connection drop out during a session, devices are configured to establish a new connection using another node in the same medium or another medium. However, as this is a new connection, traffic will be routed from and to the device by a different routing and thus the terminal will be identified by a different network address. Network address translation or handover procedures can be used if the terminal can be identified to the network, but this is only generally possible if the new connection is to the same network, and using the same communications protocols, as the previous one, or if the standby connection is permanently connected to the termination, which is wasteful of resources. Furthermore, where such handover arrangements are possible, they may only persist whilst a session is in progress.

For many secure services, it is a requirement that the network address of the system being accessed can be verified by the user accessing the system. For this reason, it is necessary that after a failover operation the network address presented to the user is the same as before the failover. In particular, in applications in which access to the system is by a specific address, rather than for example by name resolution, that address has to be preserved after a failover operation. Client terminals may reject attempts to access servers identifying themselves as being the required server if they do not have the certified address.

Example embodiments of the present invention allow data traffic which is addressed to an allocated network address to be conveyed over a replacement connection route when a primary route is not available. Example embodiments of the invention provide, in a first aspect an auxiliary network termination unit for exchanging communication data with a first network termination equipment, the auxiliary network termination unit and the first network termination equipment being comprised in Customer Premises Equipment, the auxiliary network termination unit having a secondary communications system for communicating with a secondary communications network when a primary communications connection associated with the first network termination unit meets a failover criterion, the secondary communications system being arranged to be activated in response to a signal from the first network termination equipment indicating that the primary connection has undergone a failover, and to forward communications data between the first network termination equipment and the secondary communications network using a network identity associated with the first network termination equipment.

The auxiliary network termination unit may comprise a programming processor arranged such that on initial connection between the auxiliary termination unit and a first network termination equipment, when the primary access network is in operation, a signal is transmitted to a network-based authentication system associating an identity of the auxiliary termination unit connected to a replacement access network with an identity of the first network termination equipment, to cause the first network termination unit to divert communications traffic to, and accept communications traffic from, the auxiliary termination unit having a replacement communications system for connection to a replacement access network when a failover criterion is met in the primary access network, using a network address associated in the network-based authentication system with the first network termination equipment, the replacement communications system being arranged to be activated in response to a signal from the first network termination equipment indicating that the primary access network has undergone a failover.

The auxiliary network termination unit may also be configured such that the secondary communications system is disabled if the auxiliary network termination unit detects that the first network termination equipment is connected to the primary connection.

Example embodiments of the invention also extend to a combination of such an auxiliary device with a first network termination equipment having a first communications port for connection to a network, and a second communications port for communication with the auxiliary device, and having a line test monitor to test for incoming communications traffic at the first communications port, and a routing control function arranged such that if incoming communications traffic is detected at the first communications port, outgoing communications are transmitted by way of the first communications port, and if incoming communications traffic is not detected at the first communications port, a test is conducted to determine if the auxiliary device is present at the second communications port and communications to and from the network termination equipment are redirected by way of the second first communications port. The first network termination equipment may comprise a line test monitor for monitoring the first communications port for communications traffic, and configured to direct traffic to be routed by way of the first port if traffic is detected at the first communications port for a predetermined period or number of tests.

In a complementary aspect, example embodiments of the invention provide a telecommunications system comprising a first network and a second network, the first and second networks being connectable respectively to a primary and auxiliary network termination device comprised in Customer Premises Equipment by respective first and second gateways, the first network having a routing processor for initially directing traffic having a first address to the first gateway, the first gateway being configured to redirect traffic having the first address to the second network in response to a redirection signal received by the second network from the auxiliary network termination device.

Example embodiments of the invention also provide a process for diverting data traffic over a replacement connection over a replacement access network when a primary connection over a first access network meets a failover criterion, wherein traffic addressed to an allocated network address associated with the Customer Premises Equipment in primary access network is routed to said Customer Premises Equipment via a network termination address in the replacement access network, the identity of the network termination address being authenticated by an authentication processor, associated with the primary and replacement access networks, which records an association between the allocated network address and an identity of an auxiliary network termination unit associated with the replacement access network, the association identifying the network termination address of the auxiliary network termination unit as permitted to receive traffic addressed to the allocated network address.

In embodiments of the invention, the authentication system only permits routing by the replacement connection in response to failover of the primary connection. The data traffic may be diverted to the replacement connection in response to a signal received from a primary network termination associated with the primary routing, the signal being received by way of the replacement connection. The signal may comprise authentication data relating to a first network termination equipment associated with the primary connection, such as an identity associated with an auxiliary network termination unit connected to the replacement connection. In embodiments of the invention, connection through the replacement connection may only be authorised if the second network termination is in direct communication with the primary network termination.

Example embodiments of the invention also provide for a computer system including a processor and memory storing computer program code configured to perform the process, and a computer program element comprising computer program code to, when loaded into a computer system and executed thereon, cause the computer to perform the process Embodiments of the invention make it possible that, in the event of a failure of the primary connection (e.g. a landline) the same IP address can be seen when a user's connection is diverted over a backup network (e.g. cellular), instead of, as would be usual, allocating a different IP address to the cellular network termination. This allows security checks made by authentication systems associated with the user, which rely on a specific IP address, to be passed. Embodiments of the invention provides an authentication to a service provider that the fallback network address is indeed associated with the original network address and authorises forwarding of the session over the fallback route.

In a preferred embodiment, the terminal switches automatically to the fallback system, and automatically returns to the original routing when it returns to availability. The return to the original routing may be delayed for a predetermined period to ensure that the restored original routing is stable.

BRIEF DESCRIPTION OF THE DRAWINGS

Embodiments of the invention will now be described, by way of example, with reference to the drawings, in which.

DETAILED DESCRIPTION OF PRESENT EXAMPLE EMBODIMENTS

Figure 1:
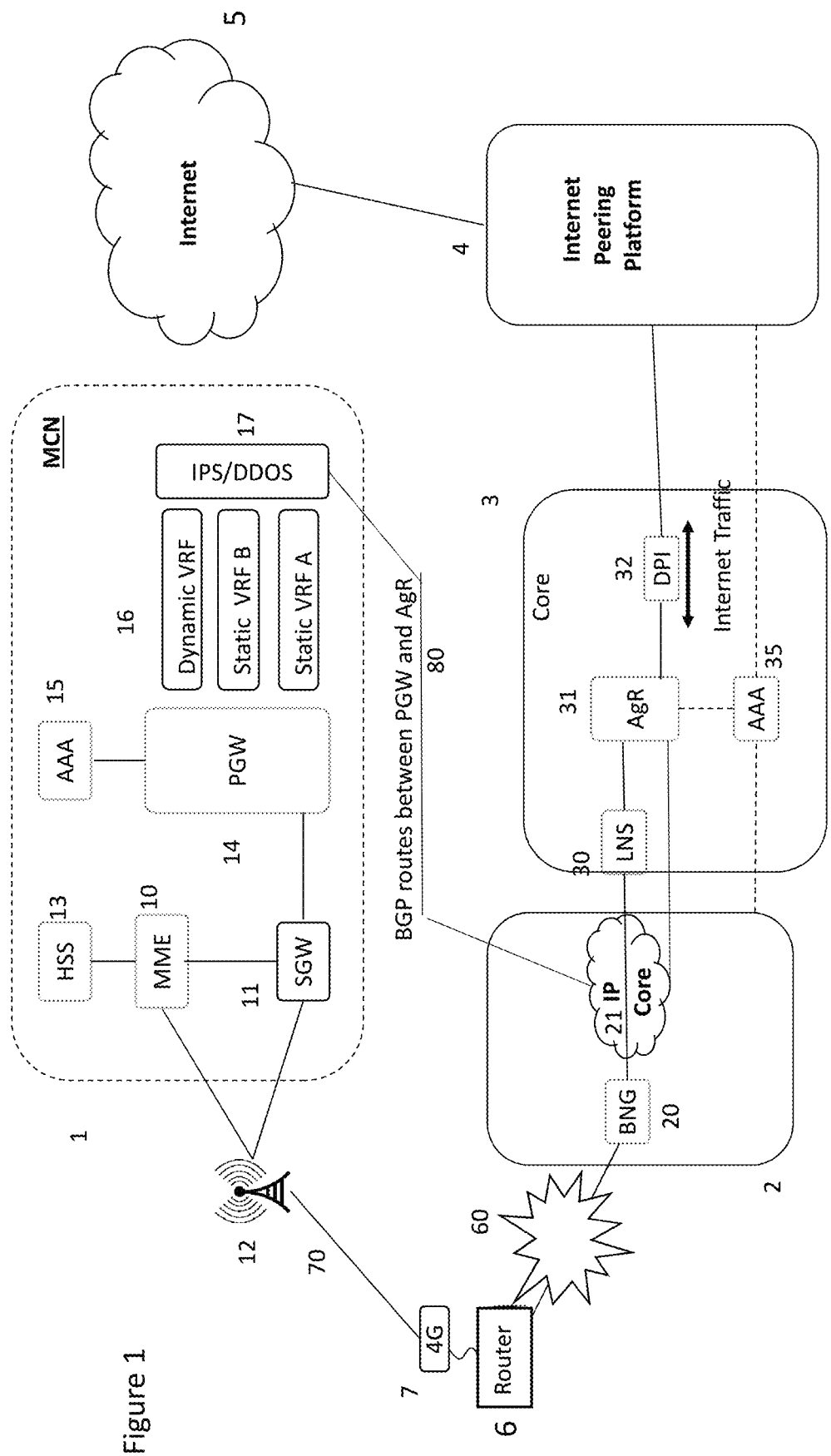
FIG. 1 depicts a general arrangement of the various elements which co-operate to perform embodiments of the invention.

FIG. 1 depicts a mobile cellular network 1 comprising, as is conventional, a mobile management entity (MME) 10 for controlling and switching session traffic, a serving gateway (SGW) 11 connected to one or more base stations 12, a home subscriber server (HSS) 13 for managing user information and authorising access, a packet data gateway (PGW) 14, with an associated authentication, authorising and accounting system (AAA) 15, a virtual routing and forwarding system (VRF) 16, and a firewall system 17, providing functions such as an intruder protection system (IPS) and defences against distributed denial of service (DDoS).

Business connections on the fixed network 2 generally allow inbound traffic from the Internet, in particular users with "static" IP addresses—that is, addresses which are not allowed to change dynamically—with no restrictions on capacity. Because of the smaller capacity of cellular networks, inbound traffic is often restricted, or not allowed at all, in order to prevent signalling storms due to unsolicited data. As the present embodiment requires incoming data to be routed over the cellular system, the packet gateway 14 and/or firewall 17 are modified to allow this, and additional security measures may be provided to mitigate problems caused by scanning or attacks. In this embodiment the serving gateway 11 is modified by providing a throttling function to limit Downlink Data Notification (DDN) and paging functions when the MME is congested.

FIG. 1 also depicts a broadband network gateway (BNG) 20 within a fixed network 2, connected by layer 2 tunnelling protocol connections over an IP Core 21 to a core network site 3 having one or more network servers 30 connected through an aggregation router (AgR) 31 and a Deep packet inspection processor 32 to an Internet Peering platform 4 and through that to the Internet 5. A second authentication, authorising and accounting system (AAA) 35 is associated with the core functions.

A user terminal 6 is normally connected to the broadband network gateway 20 through a fixed line connection 60. In this embodiment, the terminal is also connected, for example by a USB connection, to a cellular communications device 7 capable of establishing communication with the cellular network 1 through a base station 12.

A connection 80 between the cellular network 1 and the fixed network 2, using the virtual forwarding systems 16 and border gateway protocols, allows communication to be forwarded between the packet gateway 14 in the cellular system 1 and the IP Core 21 (and thus the aggregation router 31).

Figure 2:
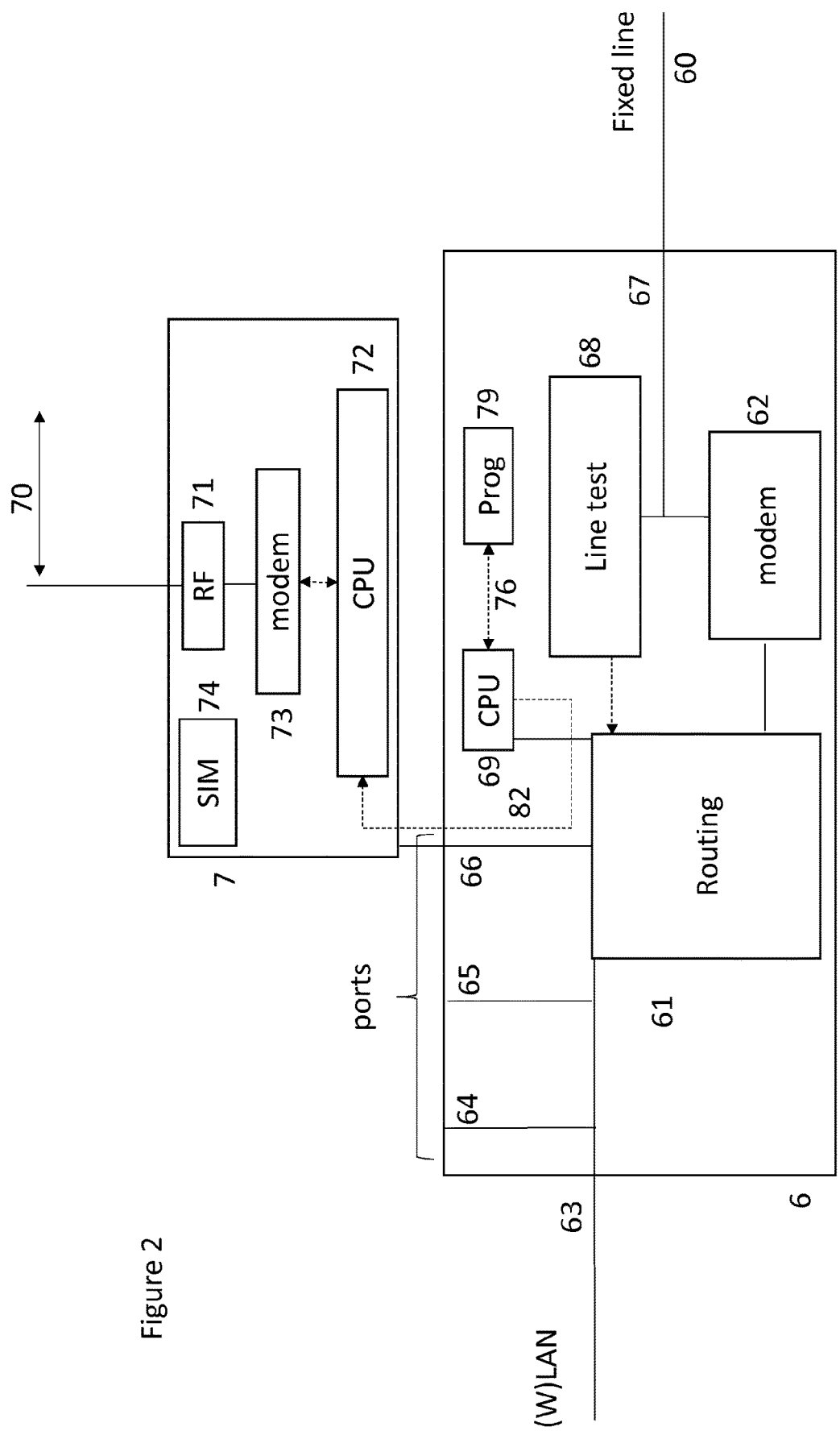
FIG. 2 is a schematic diagram illustrating the general arrangement of a communications device configured to operate according to the embodiment of FIG. 1.

FIG. 2 depicts the customer premises equipment 6, 7 of FIG. 1 in more detail. This comprises a router 6 and an add-on component 7. The router can be a standard router with a programmable CPU 69 controlling its other functions. These functions include routing of data traffic between various ports 60, 63, 64, 65, 66, 67. As shown one port 67 provides a connection through a modem 62 to a fixed line 60 such as an xDSL connection, and another port 63 provides connection to a local area network (Ethernet, powerline, Wifi etc)

In the embodiment an add-on component 7 (of the type sometimes known as a "dongle") is coupled to one of the ports 66. Depending on the coupling type of the port 66, this connection may be by any suitable connection, such as an ethernet cable, usb connection etc. The add-on component 7 is configured as a cellular communications terminal, having an RF interface 71, a modem 73 for advertising its presence and monitoring for base stations, a modem 73, and a store of authentication data 74, typically a subscriber interface module (SIM). The SIM function may be integrally stored in memory, rather than in the more conventional removable data carrier, to prevent misuse of the subscriber details, or it may be locked to the identity of the add-in module. In the cellular network 1, the identity of the SIM 74 in the add-on device 7 is mapped to a specific access point name (APN) and its downlink speed is limited. This mapping can be performed before the add-on device, and its built-in SIM, are delivered to the user of the router 6.

In the embodiment the router 6 is reconfigured on installation of the add-on component to modify some of its functions, and in particular the routing function 61. The reconfiguration may be performed by downloading program data 79 to the CPU 69 (dashed line 76), which in turn reconfigures the various functions. The program data 79 may be delivered from a data storage device attached to one of the spare ports 64, 65, or from elsewhere in the LAN through the port 63 connected to the LAN, but more typically from the service provider over the fixed line 60 and associated port 67. The add-on component 7 may also be delivered to the user with the programme data 79 stored therein, configured so that the data is downloaded to the router 6 when they are first connected through the port 66. Such an arrangement would ensure that the correct add-on component and router are coupled together.

Also on installation, the core authentication system 35 sets up an association between the internet IP address of the router 6 when addressed through the link 60, and the identity of the SIM 74 installed in the add-in unit 7. This may achieved by having the add-on unit 7 transmit the identity of its SIM 74 over the fixed line connection 60 to the authentication system 35, which can then associate the SIM identity with the network address from which it has been received.

The CPU 69 is arranged, under the programming initiated on installation of the add-on component 7, to initiate an additional function which is a line test monitor 68 on the xDSL line 60, and to control the routing function 61 such that if a failure of the fixed line 60 is detected the routing logic directs traffic to the add-on component through the port 66, and accepts traffic from the add-on component via the port 66 as if it had come from the fixed line 60.

The add on device is configured to automatically sense for a cellular network.

The line test monitor also sends an instruction to the CPU 72 (dotted line 82) to cause it to start operating, so that the add-on component 7 can attach to the cellular network 1. The modem 72 is normally switched out of use, so that communication is only possible through the add-on component 7 when the fixed line 60 is not available.

When the line test function 68 detects restoration of the connection 60, the modem function 73 is disabled, and the router is restored to its initial condition, routing traffic by way of the connection 60. This ensures that the add-on component cannot over-ride the default communications connection if the default connection is available.

The line test unit 68 may monitor the line 60 for a predetermined period or number of tests before restoring the initial routing, in order to ensure that the fixed line is in a stable condition rather than suffering intermit failures.

The programming 79 of the CPU 69 may be arranged to restore its original programming if the router 6 detects that the add-on component 7 has been disconnected from the port 66, or replaced by another add-on component. This ensures that the add-on component cannot be misused with another terminal.

Figure 3:
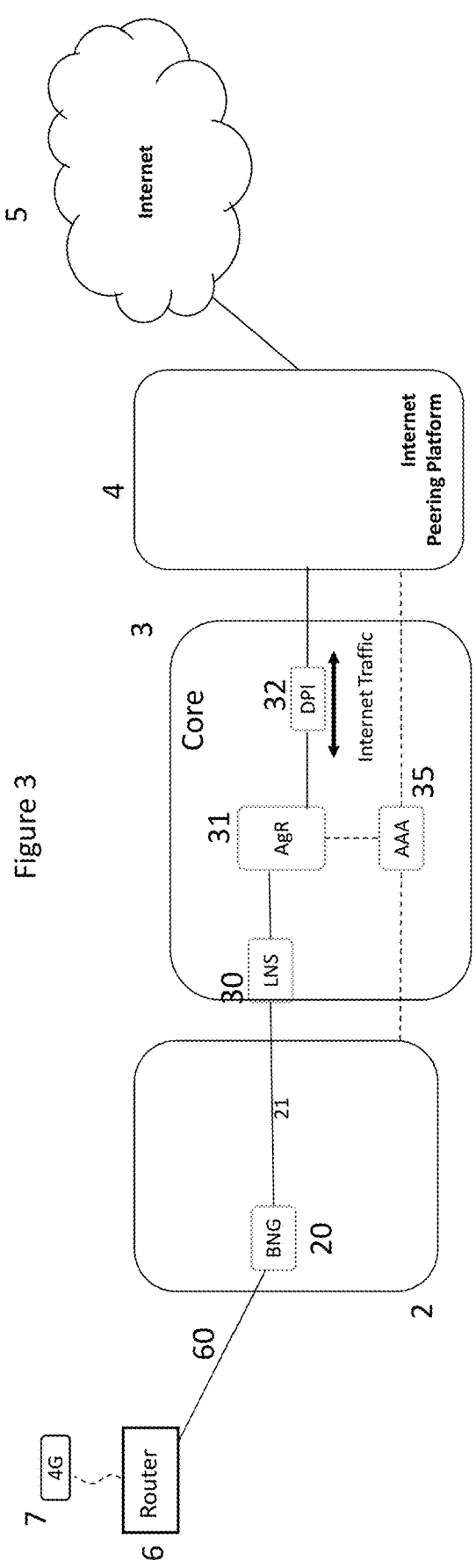
FIG. 3 is a diagrammatic representation of the operation of the system of FIGS. 1, 2 and 3 in normal operation

The operation of the embodiment is as follows. In normal operation, as shown in FIG. 3, the router 6 communicates with the internet 5 through the internet communication, which is carried out through the broadband network gateway 20 and ITP connections 21 in the fixed network 2, the network servers 30, aggregation router (AgR) 31, and deep packet inspection processor 32 in the core network, and the internet peering platform 4. Traffic is routed to the connection 60 using its Internet address, and traffic from the connection advertises that address.

Figure 4:
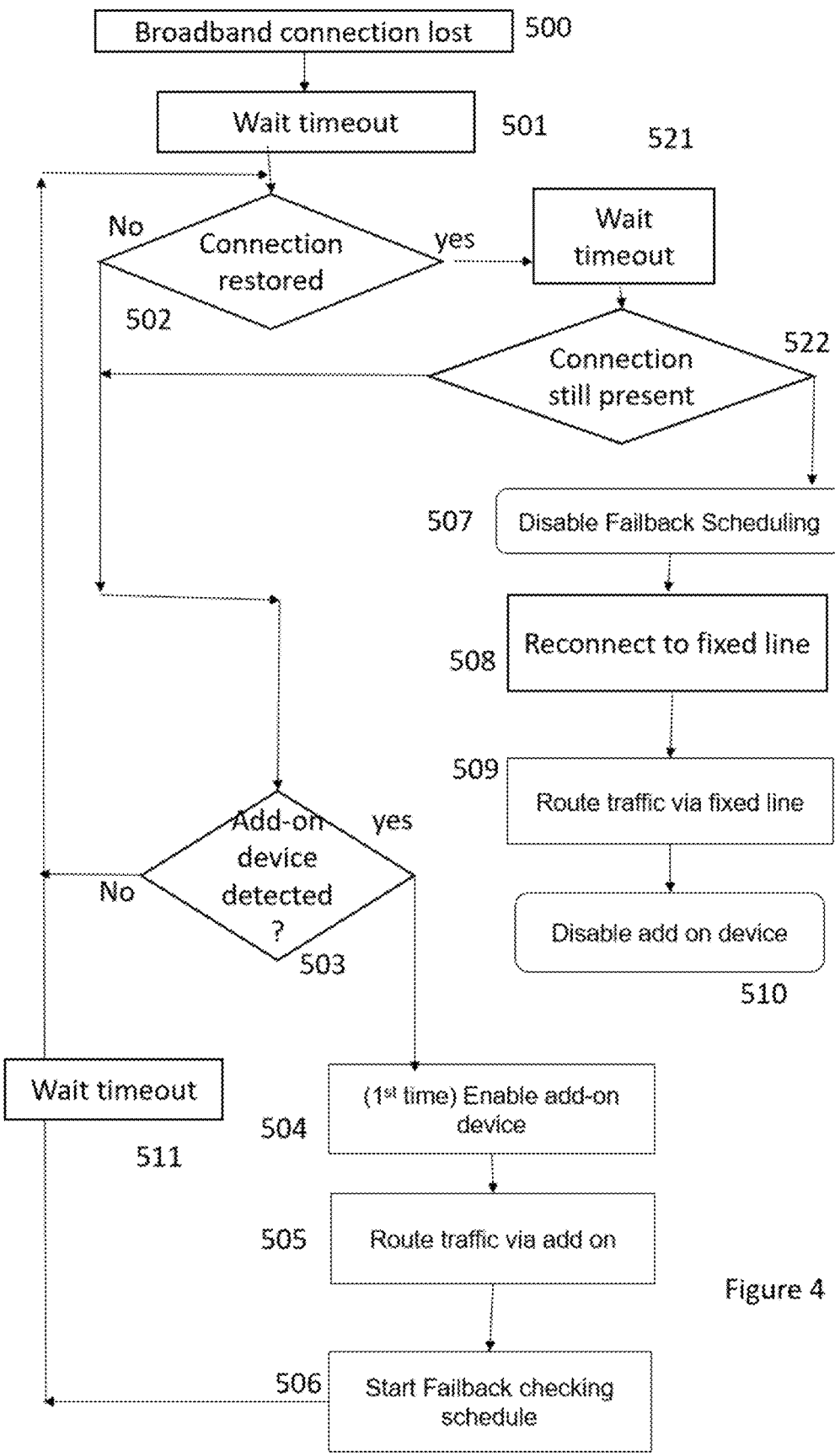
FIG. 4 is a flow diagram depicting the operation of the service platform of FIG. 3 and the co-operating device of FIG. 2 in a failover process according to example embodiments of the invention.

FIG. 4 shows the process performed by the router 6 when it fails to detect the fixed line connection 60. (Step 500) This detection may be one of a number of trigger events, such as a failure to connect on booting up, or a loss of signal from the gateway 20. After a short timeout period 501, if the connection has not been restored (step 502), a test 503 is then made to determine if the correct plug-in device 7 is present. If the plug-in device is not detected, the router continues to monitor for restoration of the fixed-line connection or connection of the add-on device.

If the add-on device 7 is detected, it is firstly enabled (step 504) if necessary, and then routes internet traffic via the port 66 connected to the add-on (step 505). The router then initiates a checking schedule (step 506) to monitor the fixed line connection for restoration of the service.

At the physical Layer, the system is always trying to come up. The checking schedule periodically runs a PPPoED (PPPover Ethernet discovery) process until the link control protocol "comes up", at which point it Receives Access-Accept messages, but then halts for a wait period (step 501, repeated), to ensure the system has stabilised before retrying a complete session using IPCP (Internet Protocol Control Protocol). If the fixed connection drops out again (and the add-on device is still present) the traffic continues to be routed via the add-on device (step 505, repeated).

When the fixed connection is restored and stable (steps 502, 521, 522) the system can automatically "fail back" to the fixed line connection by disabling the failback scheduling (step 507), re-establishing connection to the fixed line gateway (step 508) and routing traffic by way of that line (step 509). The add-on can then be disabled (step 510) and placed on standby in case of further network outages.

The DSL point to point protocol (PPP) can reconnect when the wireless system is still operating, (before taking the cellular connection 70, 80 down). However, the cellular connection 70, 80 should not come up when the DSL PPP is operating.

The timeout periods 501,511 are provided to avoid rapid switches back and forth between the two routings. Initially, when the fixed connection is first lost, a first period is instituted (501) to determine if the fault is transient. The failback checking schedule instituted when the add-on is in use (step 506) and cancelled when the fixed connection is restored (step 507) is provided (step 511) to monitor the failed connection periodically. A third timeout period (521) is provided when the connection is detected to have been restored, to determine whether the connection has stabilised.

The operation of the system whilst in the backup mode will now be discussed, again with reference to FIG. 1. In the cellular network 1, the identity of the SIM 74 in the add-on device 7 is mapped to a specific access point name (APN)

and downlink speed limit. As has been discussed with reference to FIG. 4, the router 6 will normally connect to the internet 5 using the fixed connection 60, but is programmed to connect by way of the add-on module 7 if (and only if) the fixed network has failed.

When the cellular system 10 detects a connection request from the add-on module 7, it authenticates the request using its authentication system 15 and establishes a link using the border gateway protocol route 80 between the cellular packet gateway 14 and the aggregation router 31 in the fixed network core 3, by way of the IP core 21 and IPS/DDOS firewall 17. The authentication system (AAA) 35 in the core network is used to authorize a connection 80 through the 4G connection, and to install framed routes (where required). The authentication system also assigns a static IP address to the link 80, corresponding to the address which is associated with the router 6 when connected directly through the link 60. As has been discussed previously, the correspondence can be set up in the authentication system 35 when the add-in unit is first installed, by transmitting the SIM identity over the fixed line connection 60.

The authentication system 35 can be arranged to only authorise connection over the link 80 if it cannot detect the router 6 directly over the fixed line connection 60. This ensures that the alternative routing is only used when necessary and also provides protection against fraudulent use of the cellular backup capability. As has been noted, the connection can also only be authenticated if the router and add-on device are connected to each other (step 503), thereby ensuring that the network address can only be used for communication between the router 6 and its associated identity in the authentication system 35 in the core 3.

Thus, during any time that the connection 60 is not available, the authentication system 35 will divert any traffic addressed to the "static" IP address range of the router to the add-in unit 7. When traffic is being routed by way of the cellular system 1, Dynamic IP address allocation is delegated to the Packet gateway 14 of the cellular system instead of being handled by the fixed network 2, 3.

The invention claimed is:

1. A process for diverting data traffic over a replacement connection over a replacement access network when a primary connection over a primary access network meets a failover criterion to exchange data between an auxiliary network termination unit and a first network termination equipment, the auxiliary network termination unit and the first network termination equipment being comprised in a Customer Premises Equipment, wherein traffic addressed to an allocated network address associated with the Customer Premises Equipment in the primary access network is routed to said Customer Premises Equipment via a network termination address in the replacement access network, the identity of the network termination address being authenticated by an authentication processor, associated with the primary and replacement access networks, which records an association between the allocated network address and an identity of the auxiliary network termination unit associated with the replacement access network via the authentication processor receiving the identity of the auxiliary network termination unit over the primary connection when the auxiliary network termination unit becomes coupled to the first network termination equipment, the association identifying the network termination address of the auxiliary network termination unit as permitted to receive traffic addressed to the allocated network address.

2. A process according to claim 1, wherein the authentication system only permits routing by the replacement access network in response to failover of the primary access network.

3. A process according to claim 1, wherein the data traffic is diverted to the replacement access network in response to a signal received from a primary network termination associated with the primary routing, the signal being received by way of the replacement access network.

4. A process according to claim 3, wherein the signal comprises authentication data relating to the first network termination equipment associated with the primary access network.

5. A process according to claim 4, wherein the authentication data relates to an identity associated with the auxiliary network termination unit connected to the replacement access network.

6. A process according to claim 5, wherein the replacement connection through the replacement access network is only authorised if a second network termination is in direct communication with the primary network termination.

7. A computer system including a processor and memory storing computer program code configured to perform the steps of claim 1.

8. A non-transitory computer readable medium storing computer program code to, when loaded into a computer system and executed thereon, cause the computer to perform the steps of a method as claimed in claim 1.

9. An auxiliary network termination unit for exchanging communication data with a first network termination equipment, the auxiliary network termination unit and the first network termination equipment being comprised in Customer Premises Equipment, the auxiliary network termination unit comprising a programming processor arranged such that on initial connection between the auxiliary termination unit and the first network termination equipment, when a primary access network is in operation, a signal is transmitted to a network-based authentication system associating an identity of the auxiliary termination unit connected to a replacement access network with an identity of the first network termination equipment over the primary access network in operation, to cause the first network termination equipment to divert communications traffic to, and accept communications traffic from, the auxiliary termination unit having a replacement communications system for connection to a replacement access network when a failover criterion is met in the primary access network, using a network address associated in the network-based authentication system with the first network termination equipment, the replacement communications system being arranged to be activated in response to a signal from the first network termination equipment indicating that the primary access network has undergone a failover.

10. An auxiliary network termination unit according to claim 9, configured such that the secondary communications system is disabled if the auxiliary network termination is not connected to the first network termination equipment.

11. An auxiliary network termination unit according to claim 9, configured such that the secondary communications system is disabled if the auxiliary network termination unit detects that the first network termination equipment is connected to the primary access network.

12. A system comprising:
    a first network termination equipment and an auxiliary network termination unit for exchanging communication data with the first network termination equipment, the auxiliary network termination unit and the first network termination equipment being comprised in Customer Premises Equipment, the auxiliary network termination unit comprising a programming processor arranged such that on initial connection between the auxiliary termination unit and the first network termination equipment, when a primary access network is in operation, a signal is transmitted to a network-based authentication system associating an identity of the auxiliary termination unit connected to a replacement access network with an identity of the first network termination equipment, to cause the first network termination equipment to divert communications traffic to, and accept communications traffic from, the auxiliary termination unit having a replacement communications system for connection to a replacement access network when a failover criterion is met in the primary access network, using a network address associated in the network-based authentication system with the first network termination equipment, the replacement communications system being arranged to be activated in response to a signal from the first network termination equipment indicating that the primary access network has undergone a failover; and the first network termination equipment having a first communications port for connection to a network, and a second communications port for communication with the auxiliary network termination unit and having a line test monitor to test for incoming communications traffic at the first communications port, and a routing control function arranged such that if incoming communications traffic is detected at the first communications port, outgoing communications are transmitted by way of the first communications port, and if incoming communications traffic is not detected at the first communications port, a test is conducted to determine if the auxiliary network termination unit is present at the second communications port ad communications mad from the network termination equipment are redirected by way of the second first communications port.

13. The system of claim 12, wherein the first network termination equipment comprises a line test monitor for monitoring the first communications port for communications traffic, and configured to direct traffic to be routed by way of the first port if traffic is detected at the first communications port for a predetermined period or number of tests.

14. A telecommunications system comprising a first network and a second network, the first and second networks being connectable respectively to a primary network termination device comprised in Customer Premises Equipment and an auxiliary network termination device comprised in said Customer Premises Equipment by respective first and second gateways, the first network having a routing processor for initially directing traffic having a first address to the first gateway, the first gateway being configured to redirect traffic having the first address to the second network in response to a redirection signal received by the second network from the auxiliary network termination device, wherein the first network has an authentication processor responsive to a signal indicative that a device having an identity associated with a network address is in communication with the second network through a device having a previously-authenticated association with the second gateway, the authentication processor being configured to receive an identity of the auxiliary network termination unit over the first network when the auxiliary network termination unit becomes coupled to the first network termination equipment.

15. The process according to claim 1, wherein the auxiliary network termination unit is an add on component which is connectable to a port of the first network termination equipment such that upon the initial connection between the auxiliary termination unit and the first network termination equipment, a signal is transmitted to the authentication processor associating the identity of the auxiliary termination unit associated with the replacement access network with the identity of the first network termination equipment.

16. The process according to claim 1, wherein after the failover criterion is met, the authentication processor authorizes a connection link between the primary and replacement access networks.

17. The process according to claim 16, wherein after the failover criterion is met, the authentication processor assigns an IP address to the connection link between the primary and replacement access networks.

18. The auxiliary network termination unit of claim 9, wherein the auxiliary network termination unit is an add on component which is connectable to a port of the first network termination equipment such that upon the initial connection between the auxiliary termination unit and the first network termination equipment, the signal is transmitted to the network-based authentication system associating the identity of the auxiliary termination unit connected to a replacement access network with the identity of the first network termination equipment.

19. The system according to claim 12, wherein after the failover criterion is met, the network-based authentication system is configured to authorize a connection link between the primary and replacement access networks.

20. The system according to claim 12, wherein after the failover criterion is met, the network-based authentication system is configured to assign an IP address to the connection link between the primary and replacement access networks.

21. A process for diverting data traffic over a replacement connection over a replacement access network when a primary connection over a primary access network meets a failover criterion to exchange data between an auxiliary network termination unit and a first network termination equipment, the auxiliary network termination unit and the first network termination equipment being comprised in a Customer Premises Equipment, wherein traffic addressed to an allocated network address associated with the Customer Premises Equipment in the primary access network is routed to said Customer Premises Equipment via a network termination address in the replacement access network, the identity of the network termination address being authenticated by an authentication processor, associated with the primary and replacement access networks, which records an association between the allocated network address and an identity of the auxiliary network termination unit associated with the replacement access network, the association identifying the network termination address of the auxiliary network termination unit as permitted to receive traffic addressed to the allocated network address; and wherein the first network termination equipment has a first communications port for connection to a network, and a second communications port for communication with the auxiliary network termination unit, and the process comprises:

conducting a line test monitor to test for incoming communications traffic at the first communications port, and performing a routing control such that:
- if incoming communications traffic is detected at the first communications port, outgoing communications are transmitted by way of the first communications port, and
- if incoming communications traffic is not detected at the first communications port, conducting a test to determine if the auxiliary network termination unit is present at the second communications port and redirecting communications to and from the network termination equipment by way of the second first communications port based on a determination that the auxiliary network termination unit is present at the second communications port.

\* \* \* \* \*